United States Patent [19]
Johnson et al.

[11] 3,819,947
[45] June 25, 1974

[54] PHOTODYNAMIC MONITOR FOR AND PROCESS OF DETECTING THE MOMENTARY PRESENCE OF AN OBJECT BETWEEN TWO POINTS

[75] Inventors: Winston O. Johnson, Smyrna; David W. Davis, Stone Mountain, both of Ga.

[73] Assignees: Ted Willis, Atlanta, Ga.; Willis H. Holley, Panama City, Fla.; Harold L. Lyles, Sumter, S.C.; Kennedy H. Sharp, Hiddenite, N.C.; William L. Stuart, Jacksonsville, Fla. ; a part interest to each

[22] Filed: Dec. 26, 1972

[21] Appl. No.: 318,621

[52] U.S. Cl.................. 250/559, 250/338, 250/552, 250/562
[51] Int. Cl. ............................................ G01n 21/30
[58] Field of Search ......... 250/219 S, 219 WE, 559, 250/562, 338, 552; 328/2

[56] References Cited
UNITED STATES PATENTS

| | | | |
|---|---|---|---|
| 2,850,645 | 9/1958 | Chilton............................ | 250/219 S |
| 2,928,073 | 3/1960 | Grenias................................. | 328/2 |
| 3,019,972 | 2/1962 | Strother...................... | 250/219 WE |
| 3,150,264 | 9/1964 | Ehlert................................ | 250/210 |
| 3,264,480 | 8/1966 | Zuck et al............................. | 328/2 |
| 3,305,688 | 2/1967 | Lamparter...................... | 250/219 S |
| 3,575,515 | 4/1971 | Fertig.......................... | 250/219 WE |

*Primary Examiner*—James W. Lawrence
*Assistant Examiner*—Harold A. Dixon
*Attorney, Agent, or Firm*—Newton, Hopkins & Ormsby

[57] ABSTRACT

A photodynamic monitor or stop motion machine for detecting when a yarn has passed across a space and for automatically biasing a circuit to shut down a textile machine upon such an occurence. The stop motion machine has one or a plurality of transmitters for transmitting infrared light in time-spaced pulses across a tufting machine (or other textile machine) adjacent selected yarns, and one or more transducers which digitally compare the original signal with the received signal for biasing the fail safe control circuit when a programmed discontinuity is detected. Reflecting surfaces direct the light pulses along prescribed paths between one or more of the transmitters and transducers.

The transmitter includes a pulse generator, generating pulses in the 2kH$_z$ range, each having a duration of 25 microseconds, and a current regulating amplifier which feeds these pulses to one or a plurality of infrared emitting diodes. The transducer includes one or more infrared sensing detectors, for receiving the infrared beams, each detector being also illuminated by an individually controlled lamp, the brighness of which is adjusted so as to extend the modulation transfer function characteristics of the detector, and thus, improve the high frequency response of the detector. The received signal of each sensing detector is sent through a detector amplifier to the reset circuit of a counter, into which counter the signal from the pulse generator is also sent. The counter and reset circuit includes a Nand Gate Schmitt trigger which detects any drop in amplitude of the signal and a comparator gate which transmits the pulse counter differential to a decoder programmed to trigger the fail safe circuit when a given number of successive pulses is received.

39 Claims, 12 Drawing Figures

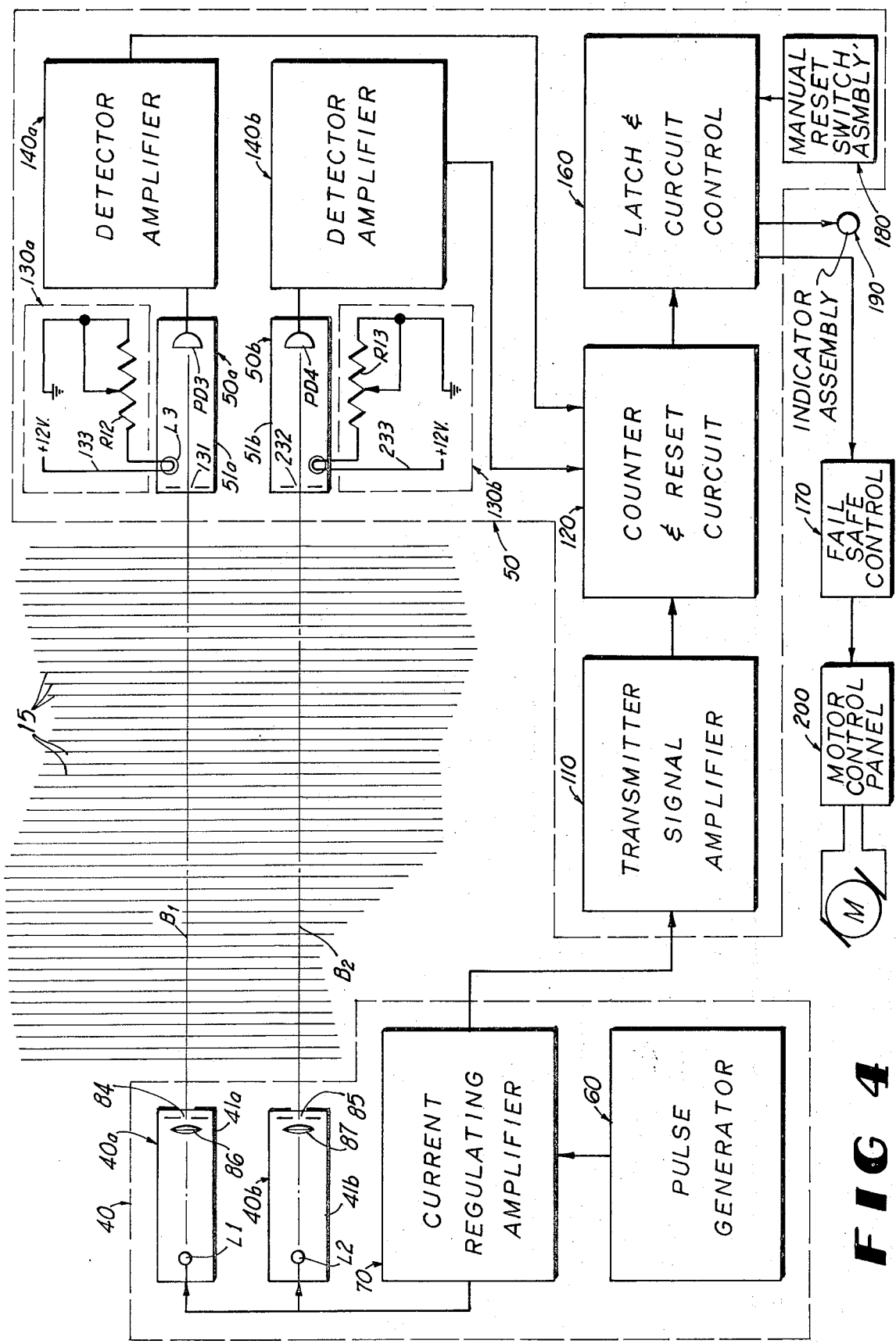

PHOTODYNAMIC MONITOR FOR AND PROCESS OF DETECTING THE MOMENTARY PRESENCE OF AN OBJECT BETWEEN TWO POINTS

BACKGROUND OF THE INVENTION

This invention relates to a photodynamic monitor for and process of detecting the momentary presence of an object between two points and is more particularly concerned with an electronic digital infrared pulse generating stop motion machine for a textile machine and particularly a tufting machine.

In the prior art are the following patents of which applicants have knowledge:
3,687,095
3,676,009
3,677,307
3,620,630
3,610,938
3,608,590
3,602,727
3,594,755
3,591,294
3,582,661
3,530,690
3,529,560
3,515,883
3,421,007
3,401,267
3,379,225
3,340,764
3,340,400
3,337,736
3,287,887
3,174,046
3,099,827
3,043,991
2,967,947
2,711,093

The above patents represent some of a number of prior art machines for responding electronically to the presence of a fiber in light beam. Most of the prior art stop motion machines are essentially analog in nature and are, therefore, quite delicate, requiring considerable power, and do not always distinguish between a yarn, which momentarily cuts the beam, and dust or other matter in the air. They may be responsive to changes in temperature, to variation in intensity of the ambient light, to reflected light, to changes in line voltage or line interference. Vibrations, moisture, radio frequency signals and induction from magnetic and electrostatic sources are still other forms of interference which may cause malfunction of the prior art stop motion machines. They are also expensive, difficult to maintain and at times erratic in operation.

No prior art stop motion machine, to the best of our knowledge, operates on essentially an infrared pulse transmitting, digital logic arrangement, such as our present device. Therefore, probably none of the prior art stop motion machines use energy as efficiently as our device and none will lend itself to being selectively programmed to detect accurately a prescribed pulse differential predictably caused when a yarn or some other object passes across an infrared beam.

BRIEF DESCRIPTION OF THE INVENTION

The present invention, which is intended to overcome the disadvantages described above, includes, in it simpler form, a transmitter and transducer, the transmitter generating spaced pulses converted into a beamed signal, or a plurality of such beamed signals, in the infrared spectrum range, and directed by lense and reflective optics to the sensor of the transducer or transducers. The transducer has a logic circuit which digitally compares the pulses of the signal with the generated pulses and detects any absence of received pulses and pulses of diminished amplitude, decoded, digitally so as to react when a programmed number of interrupted pulses, in a prescribed time lapse is present, representative of the particular yarn which has cut the beam. Thus detected, the transducer causes an audio or visual signal and a biasing of a fail safe control circuit to the motor of the tufting machine for purposes of de-energizing the motor.

The present device, while being primarily useful as a stop motion machine can be used in numerous ways to monitor areas. For example, it could be used as a burglar alarm or fire alarm to detect a burglar crossing the beam or the presence of smoke.

Accordingly, it is an object for the present invention to provide a photodynamic monitor which is inexpensive to manufacture, durable in structure and efficient in operation.

Another object of the present invention is to provide an accurate process of detecting when an object has passed between two points.

Another object of the present invention is to provide a photodynamic monitor which requires a low amount of electrical energy in order to operate properly.

Another object of the present invention is to provide a photodynamic monitor, the operation of which will not normally be affected by extraneous light, ambient conditions, current fluctuations, electromagnetic interferences, or the like.

Another object of the present invention is to provide a stop motion machine which can simultaneously scan for breaks a large number of warp yarns, the stop motion machine being easily and readily installed on textile machines of various types.

Another object of the present invention is to provide, in a tufting machine, a stop motion mechanism which will indicate when a yarn fed from the creel to the needle has been broken.

Another object of the present invention is to provide a stop motion machine which is essentially digital in nature and can be programmed for optimum detection of a yarn or other object passing across the beam of the stop motion machine, and once programmed, requires no tuning or adjusting.

Another object of the present invention is to provide a stop motion machine which will remain essentially unaffected by dust or extraneous matter which may be carried by the air past the beam of the stop motion machine.

Another object of the present invention is to provide a stop motion machine which lends itself well to scanning simultaneously a plurality of areas along one or more sheets of yarns and for signaling when any one thereof has a broken yarn.

Other objects, features, and advantages of the present invention will become apparent from the following description when taken in conjunction with the accompanying drawings wherein like characters of reference designate corresponding parts throughout the several views.

Figure 1:
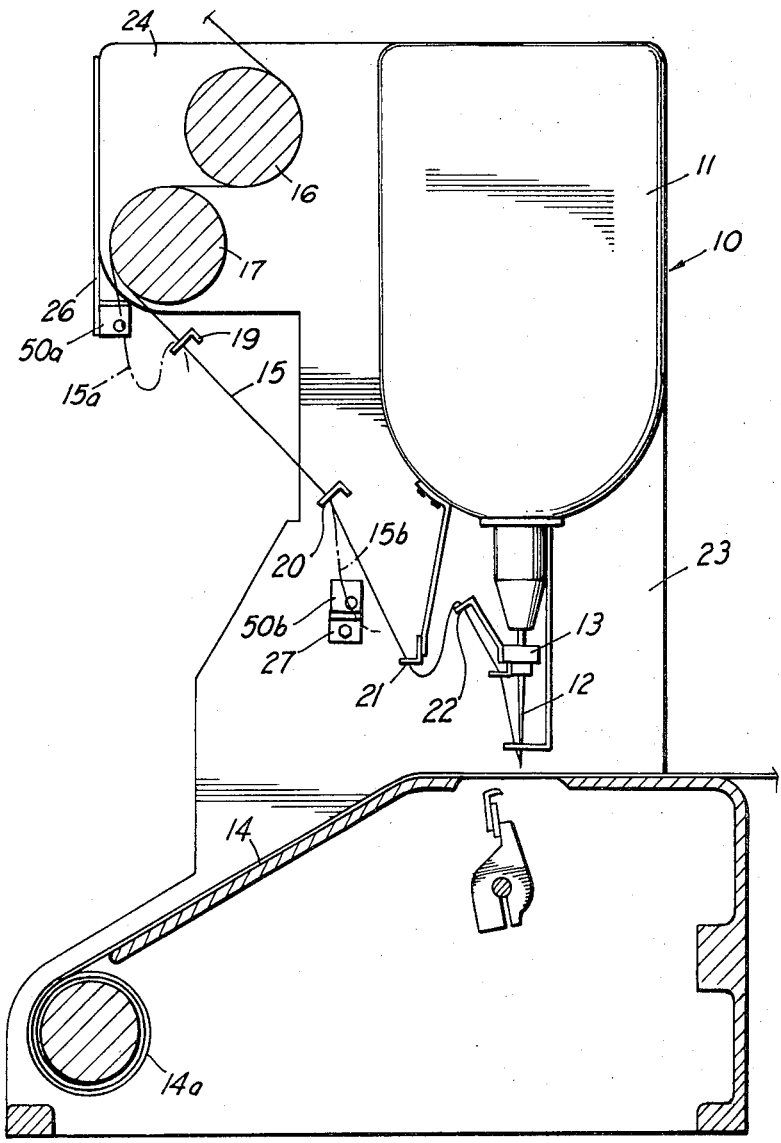
FIG. 1 is a schematic, fragmentary, side elevational view of a tufting machine provided with a stop motion machine constructed in accordance with the present invention, broken yarns being depicted by broken lines.
Figure 5B:
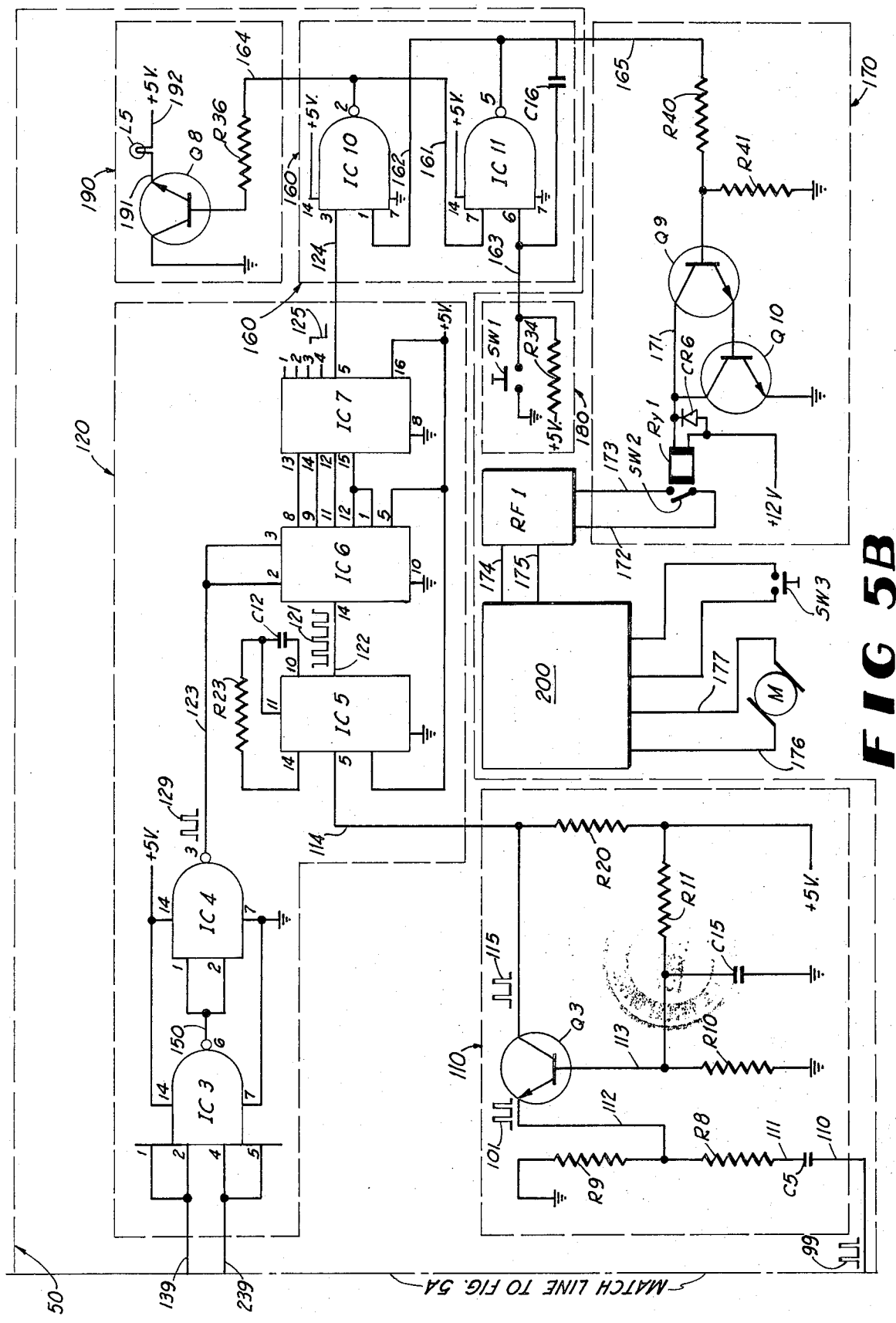
Figure 6:
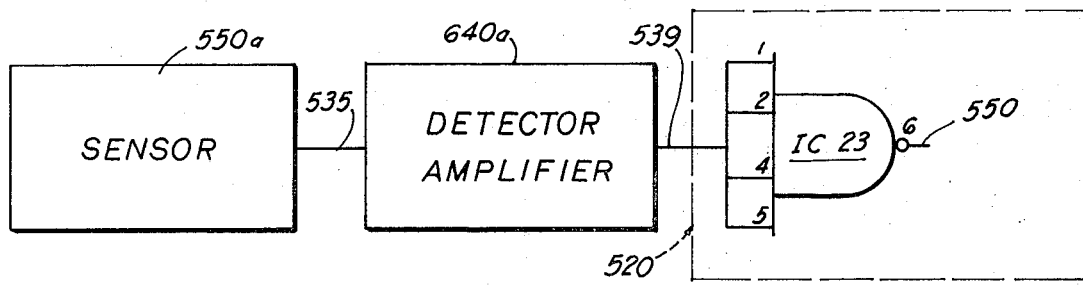
Figure 7:
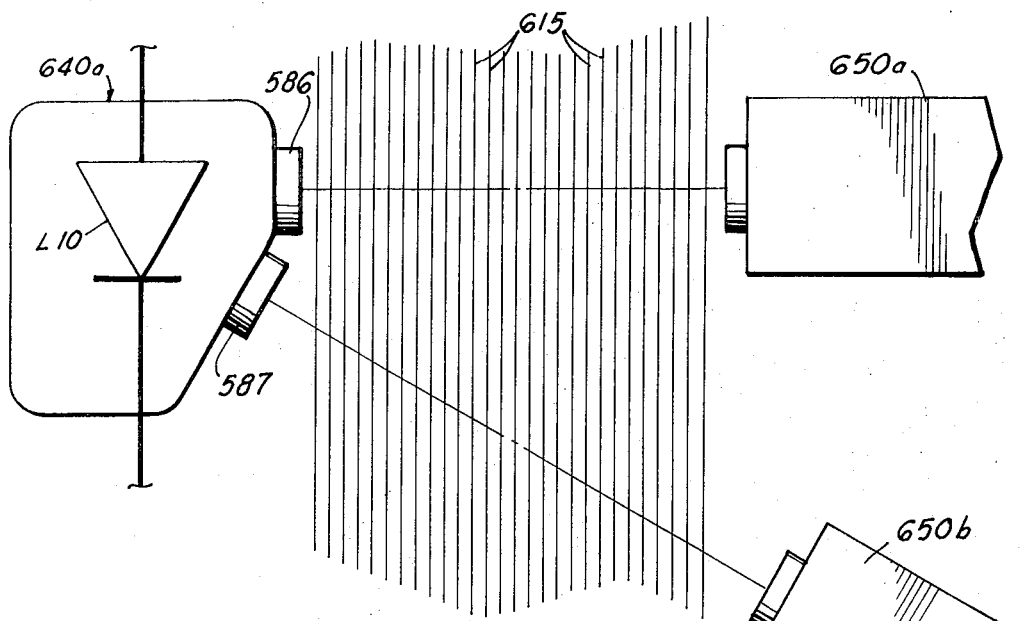
Figure 8:
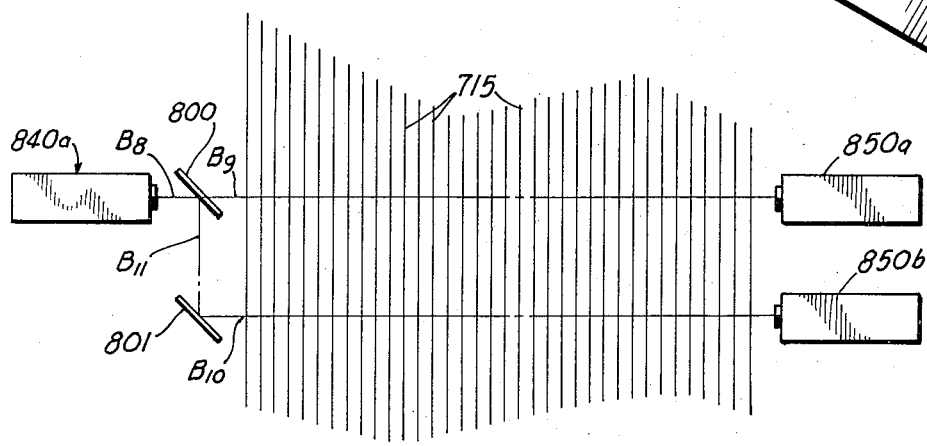

FIG, 4 is a schematic block diagram of the wiring of the stop motion machine depicted in FIG. 1;

Figure 5A:
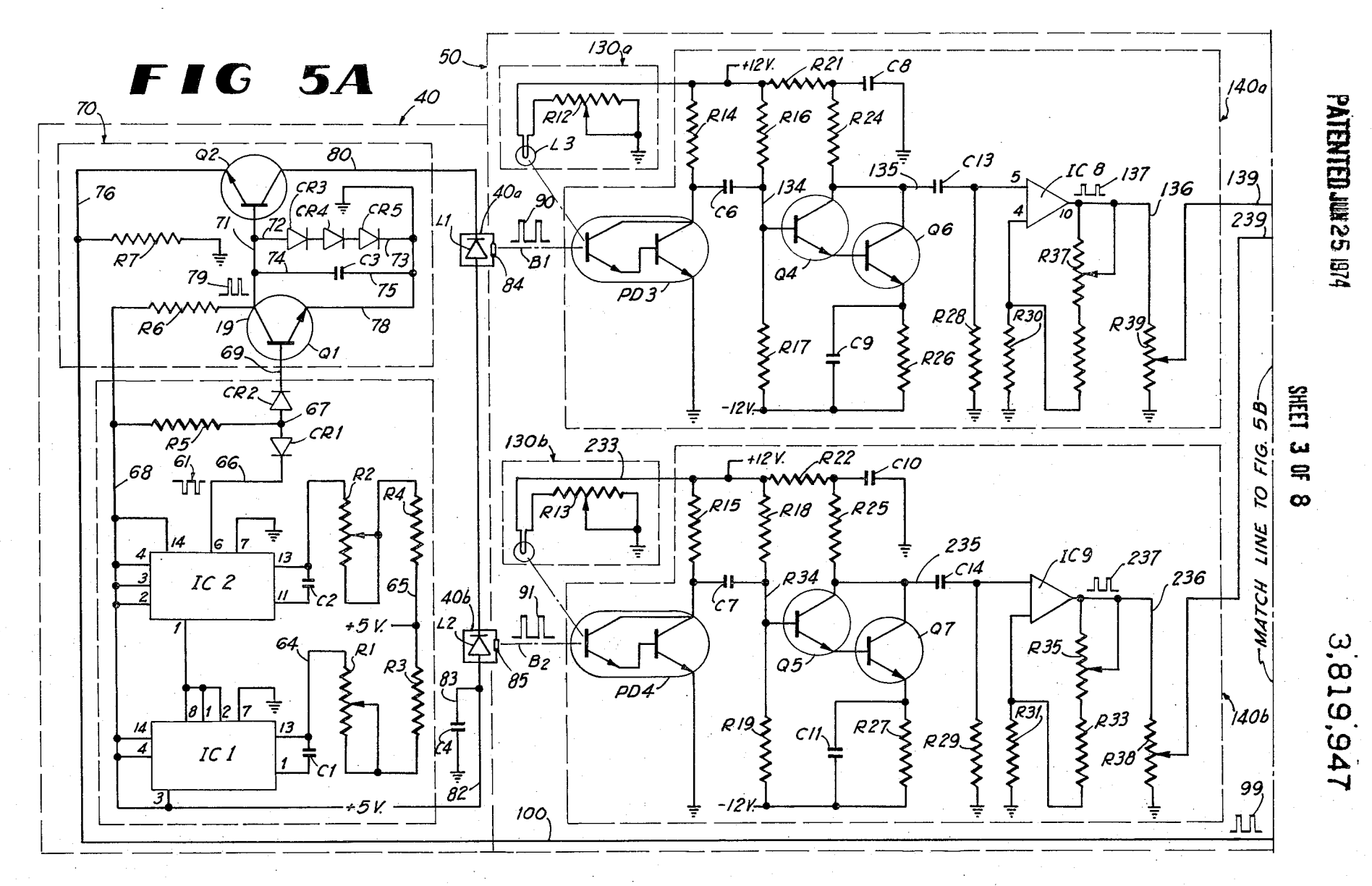

FIG. 5A is a schematic wiring diagram of a portion of the stop motion machine depicted in FIG. 4;

FIG. 5B is the remaining portion of the wiring diagram of FIG. 5A;

FIG. 6 illustrates a modification to the wiring diagram of FIGS. 5A and B so as to adapt the circuity for a single infrared beam;

FIG. 7 is a schematic diagram, illustrating another modification of the wiring diagram in FIGS. 5A and B adapting the structure for directing light from a single emitter of the transmitter to a plurality of sensors of the transducers;

FIG. 8 is a schematic diagram showing another form of a single emitter directing light to a plurality of sensors of a transducer.

Figure 9:
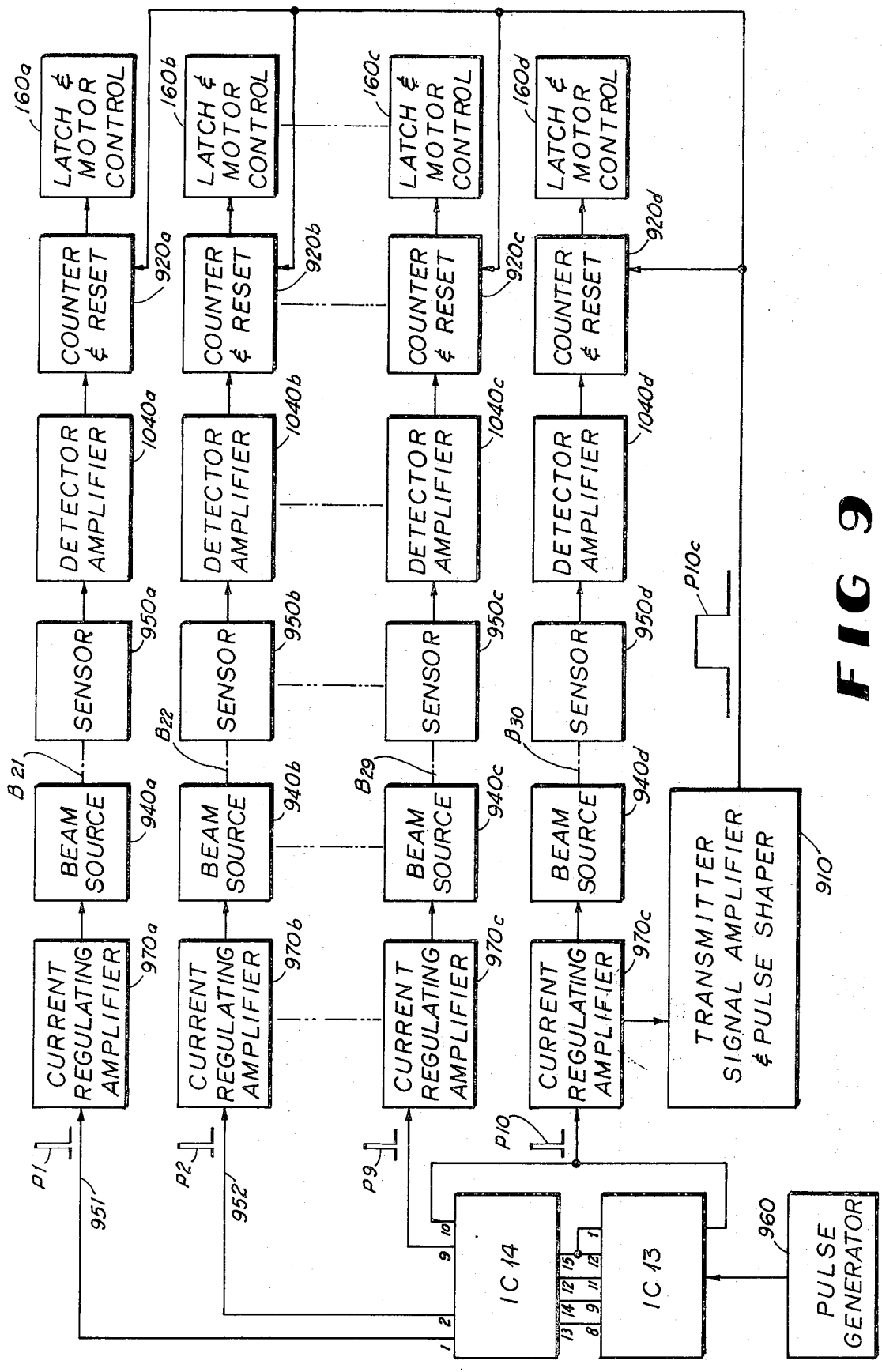
Figure 10:
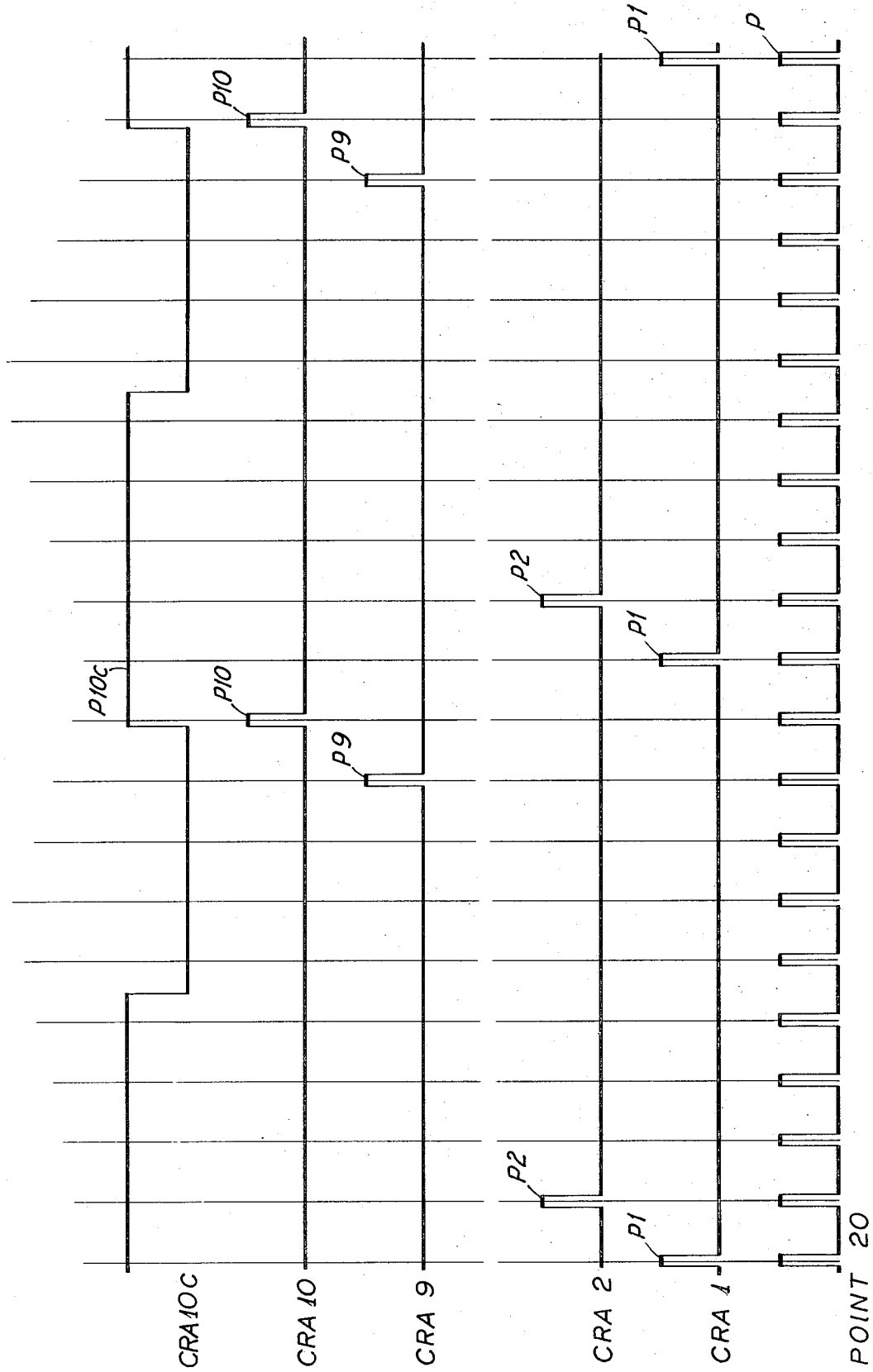

FIG. 9 is another modified form of the schematic block diagram of FIG. 4 showing a transmitter with a plurality of emitters transmitting to a plurality of individual detector amplifiers of the transducers and FIG. 10 is a time-voltage graph depicting the operation of the circuity of FIG. 9.

Figure 11:
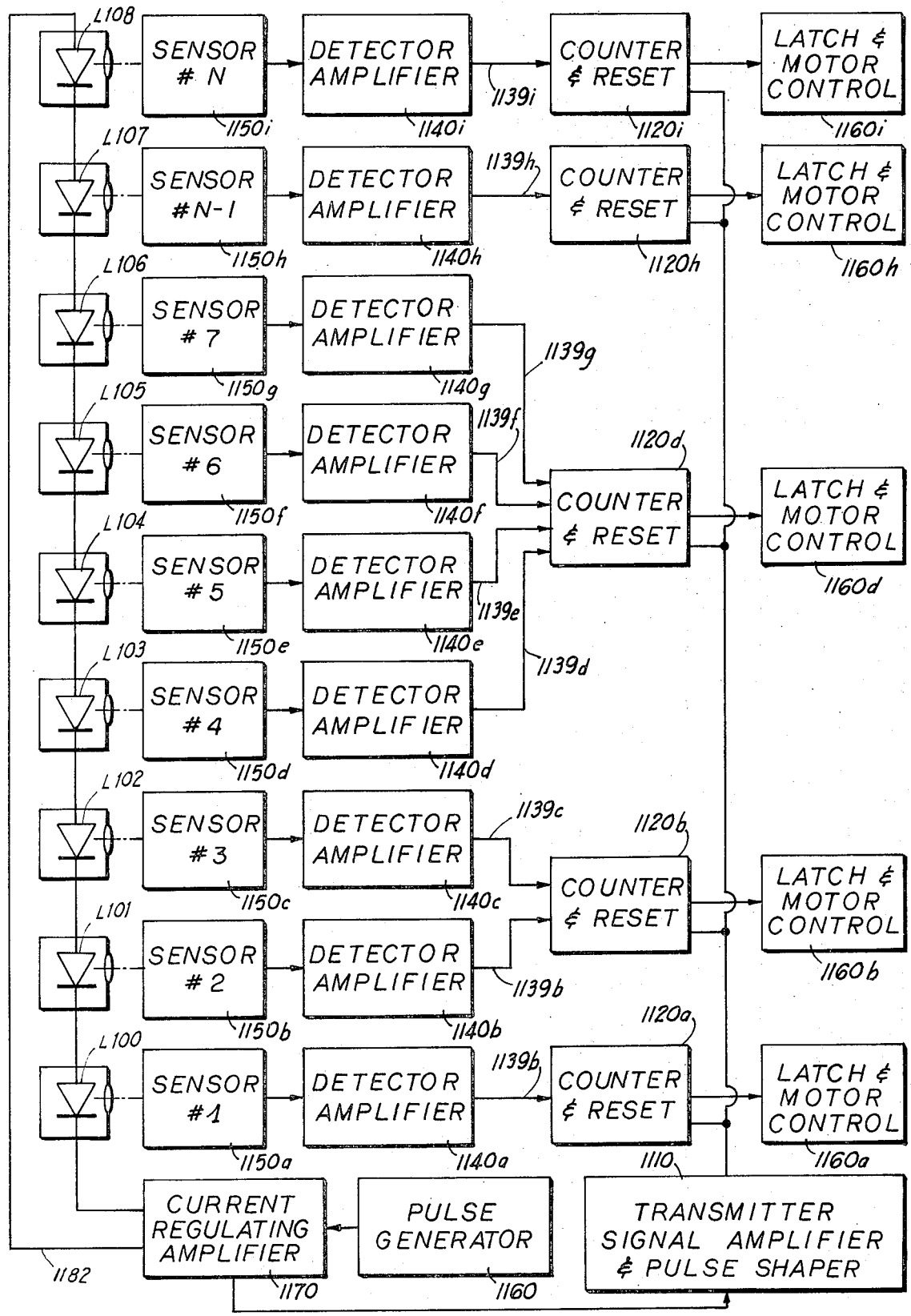

FIG. 11 is a schematic diagram of another modified form of the present invention, showing the use of a single pulse generator and a single current control amplifier for simultaneously triggering a plurality of infrared emitting diodes and individual transducers therefor to detect broken yarns in a plurality of warp sheet locations for controlling a plurality of textile machines.

DETAILED DESCRIPTION

Referring now to the embodiments chosen for the purpose of illustrating the present invention, numeral 10 in FIG. 1, denotes generally a tufting machine or some other textile machine wherein a plurality of yarns 15 are fed, as a yarn sheet or group of parallel juxtaposed yarns 15 along a prescribed path. As shown in broken lines, one or several of the yarns 15a and 15b will move out of the plane of the yarn sheet when it or they are broken.

In more detail, the tufting machine 10 includes a frame 11, having a bank of tufting needles 12 which are simultaneously reciprocated in a vertical path by a needle bar 13. Backing material 14 from a roll 14a is fed beneath the needles 12 so that the yarns 15, which are fed to the needles 12 may be inserted, by those needles, into the backing material 14.

The yarns 15 are conventionally fed from a creel (not shown) by means of feed rollers 16 and 17. The yarns 15, thence, pass along a downwardly and inwardly inclined path, from the lower feed roller 17, through upper and lower guides 19 and 20, to the yarn jerker guides 21 and 22 and to needles 12.

The tufting machine 10 has end posts, such as end post 23, and feed roller support flanges, such as flange 24.

All of the above described structure is conventional in a tufting machine, as will be understood by those skilled in the art, rollers 16 and 17 being illustrative of any of a number of yarn feed mechanisms.

According to the present invention, the photodynamic monitor or stop motion machine of the present invention, in the embodiment depicted in FIGS. 1, 4, 5A and 5B, includes, as seen in FIG. 4, a transmitter 40 having a pair of beam sources 40a and 40b and a transducer 50 having two sensors 50a and 50b, the sensors 50a and 50b for respectively receiving the electromagnetic radiation beams $B_1$ and $B_2$ from the beam sources 40a and 40b.

Preferably, the closures or boxes 41a and 41b of beam sources 40a and 40b are carried by straps 26 and 27 mounted respectively on the flange 24 and the corner post 23, while the closures or boxes 51a and 51b of sensors 50a and 50b are mounted in opposition to the closures 41a and 41b on the corresponding flange (not shown) and the corresponding post (not shown). Thus, the beam $B_1$ (FIG. 4) from source 40a, is directed parallel to the sheet and perpendicularly to the yarns 15, of the inclined sheet of yarns 15, immediately adjacent and below the increment of yarns 15 which extend between roller 17 and guide 19. In like manner, the beam $B_2$ is immediately adjacent and below the increment of yarns 15 between guides 20 and 21.

A break in any of the yarns 15 between the creel (not shown) and roller 17 will probably manifest itself as a slack yarn 15a between roller 17 and guide 19, while a break at the needle 12 will usually manifest itself by a slack yarn 15b between guides 20 and 21. The slack yarn 15a or 15b will fall through the beam $B_1$ or $B_2$ interrupting entirely, a number of pulses or altering, materially, the amplitude of a certain number of pulses in either beam $B_1$ or $B_2$. This, in turn, will actuate the stop motion machine to stop the motor M (FIG. 5B) of the machine, as will be described, hereinafter.

TRANSMITTER

As best seen in FIG. 5A the transmitter 40 includes a pulse generator 60 having two integrated free running, multivibrators IC 1 and IC 2. The function of multivibrators IC 1 and IC 2 is to generate a train of spaced negative going, logic level, zero pulses 61. The discrete time spaced successive pulses 61 are each 25 microseconds in pulse width or duration and have a repetition rate of 2 kilohertz.

This repetition rate was selected so that the normal movement of yarn 15a or 15b in cutting across beam $B_1$ or $B_2$, would interrupt or alter more than four sequential pulses.

Both multivibrators IC 1 and IC 2 are 9601 Sigmatic or Motorola chips in D packages. Multivibrator IC 1 generates the repetition rate by means of a RC circuit comprising capacitor C1 and potentiometer R 1. The pulse width is generated by multivibrator IC 2 by means of capacitor C 2 and potentiometer R 2. Adjustment of potentiometer R 1 will alter the frequency of the pulse rate and adjustment of potentiometer R 2 will alter the duration or width of the pulse.

Points or pins 3, 4, and 14 of multivibrator IC 1 are connected, via wire 63, to +5 d.c. volts potential and point or pin 7 to ground, while a capacitor C1 is connected across points 11 and 13 thereof. Pin 13 of multivibrator IC 1 is connected, via wire 62, through the series arranged, potentiometer R 1 and Resistor R 3, to the +5 d.c. voltage. Resistor R 1 is 10,000 ohms and resistor R 3 is 5,100 ohms.

Points 1, 2 and 8 of multivibrator IC 1 are all connected to point 1 of multivibrator IC 2 for transmitting the repetition rate to multivibrator IC 2.

Points 2, 3, 4 and 14 of multivibrator IC 2 are connected, via wire 68, to +5 volts and point 7 thereof, to ground. Capacitor C 2 is disposed across points 11 and 13 of multivibrator IC 2 while point 13 is connected, via wire 64 and the series arranged potentiometer R 2 and resistor R 4, to the wire 65, supplying +5 volts d.c.

Point 6 of multivibrator IC 2 is connected, via wire 66, to the cathode of diode CR 1 of the back-to-back diodes CR 1 and CR 2, the point or junction 67 of the anodes of diodes CR 1 and CR 2 is connected, through resistor R 5 and wire 68, to the +5 volt supply.

From the cathode of diode CR 2, wire 69 leads to the current regulating amplifier, denoted generally by numeral 70, and specifically to the base of the junction transistor Q 1, therein. The emitter of transistor Q 1 is connected, via wire 78, to ground, while its collector is connected to the +5 volts power supply through resistor R 6 and wire 68. Also, the collector of transistor Q 1 is connected, via wire 71, to the base of transistor Q 2.

Three series connected diodes CR 3, CR 4, and CR 5 are disposed, via wires 72 and 73, across the line between wire 71 and ground, the anode of the first diode CR 3 being connected to wire 71 and the cathode of the third diode CR 5 being connected, via wire 78, to ground.

In parallel with the diodes CR 3, CR 4, and CR 5 and also in parallel across the collector and emitter of transistor Q 1 is capacitor C 3 which is connected by wire 74 to wire 71 and wire 75 to ground.

The diodes CR 1 and CR 2 in conjunction with transistor Q 1 function as a power inverter for transforming the negative going pulses, depicted at numeral 61, into positive pulses, depicted at numeral 79, fed along wire 71 to the base of junction transistor Q 2.

The emitter of junction transistor Q 2 is connected, via wire 76 and resistor R 7, to ground. The collector of transistor Q 2 is connected, via wire 80, to the cathode of an infrared light emitting diode L 1 the anode of which is connected, via wire 81, to the cathode of a second infrared light emitting diode L 2. The anode of diode L 1 is connected, via wire 82, to the +5 volt source.

A large voltage regulating capacitor C 4 is connected, via wire 83, to wire 82. The other side of capacitor C 4 is connected to ground.

Therefore, the diodes L 1 and L 2 each emit, in phase with each other, 25 microsecond infrared flashes, successive flashes being 500 microseconds apart. The pulses of beams $B_1$ and $B_2$ are depicted at numerals 90 and 91.

TRANSDUCER

The transducer, denoted generally by numeral 50, is fed a synchronized signal of pulses 99 from the emitter of transistor Q 2, via wire 100, through a capacitor C 5. In more detail, the capacitor C 5 is connected to the emitter of transistor Q 2 by wire 100 so that it receives positive pulses 99 of about 0.8 volts each. The other side of capacitor C 5 is grounded through wire 111 and through the series arranged, current dividing resistors R 8 and R 9. A center tap wire 112, leading from the junction of resistor R 8 and R 9, leads to the emitter of a grounded base transistor amplifier Q 3 in the transmitter signal amplifier. The voltage drop across resistor R 8 provides a potential for each pulse 101 at wire 112 of 0.4 volts.

The base of transistor Q 3 is grounded through resistor R 10 and is connected to the +5 volt source through wire 113 and resistor R 11. A capacitor C 15 is connected from wire 113 to ground.

The collector of transistor Q 3 is connected via wire 114 to pin 5 of the one shot multivibrator IC 5 of the counter and reset circuit. A resistor R 20 is connected between wire 114 to the +5 volt source.

The function of the transistor Q 3 and indeed the transmitter signal amplifier 110 (FIGS. 4 and 5B) is to step up the 0.8 volt pulse input (as shown at 99) to a 4.9 volt pulse (as shown at 115), the latter being sufficient to actuate the multivibrator IC 5.

Multivibrator IC 5 is part of the counter and reset circuit 120 and is for the purpose of altering the generated pulse width from 25 microseconds to 300 microseconds (depicted at numeral 121), thereby reducing the likelihood of error due to noise interference or the sensitivity of the elements. Each 300 microseconds pulse 121, however, is synchronized with and starts when the 25 microsecond pulse 99 starts.

For accomplishing this function, multivibrator IC 5 is provided with a capacitor C 12 across pins 10 and 11 and a resistor R 23 across pins 14 and 11. The power to multivibrator IC 5 is supplied from the +5 volt source. The generated signal or pulse 121 of 300 microseconds with a dwell of 200 microseconds is transmitted, via wire 122, to pin 14 of the fourlevel binary counter or scaler IC 6. Pin 5 of counter IC 6 is connected to the +5 volt source and pin 10 is grounded.

Pins 2 and 3 of counter IC 6 are connected to wire 123. Also, pins 8, 9, 11 and 12 of counter IC 6 are connected respectively to pins 13, 14, 12 and 15 of a binary to digital decode IC 7. Pin 1 of counter IC 6 is connected to pin 15 of decoder IC 7. Power for the decoder IC 7 is provided from the +5 volt source and to ground. Pins 2, 3, 4 or 5 selectively provide the output to wire 124, depending upon the number of pulses to be counted. In the drawing, pin 5 is connected to wire 124 since it will permit the feeding of a negative going pulse 125 when the absence or alteration of four pulses is detected in beam $B_1$ or $B_2$. This will be explained more fully hereinafter.

Referring back to FIG. 4, the sensors 50a and 50b, are substantially identical in structure and the detector amplifier circuits 140a and 140b are identical. Sensor 50a includes a closed rectangular hollow box, housing or closure 50c having a 0.1 to 0.2 inch diameter opening or iris 131 in one end. Within the end portion opposite iris 131 is the infrared photoelectric detector, in the form of a photosensitive transistor known as a photo-Darlington, PD3.

A constant, adjustable source of illumination 130a is provided within the above mentioned housing 50a to maintain a level of illumination on photo-Darlington PD3 which we have determined extends the modulation transfer characteristics of this photo-Darlington, for developing satisfactory sensitivity of this detector for the infrared pulses of focussed beam $B_1$ which pulses lie in a portion of the frequency spectrum an order at magnitude beyond the normal responsive limits of the photo-Darlington. In more detail, within the forward portion of housing 51a is an incandescent lamp L 3 which is energized from a +12 volt source, via wire 133, the lamp L 3 being connected to ground through a potentiometer R 12. The intensity of the lamp L 3 may, therefore, be incrementally varied by potentiometer R 12.

As is customary in Darlington pairs, such as detector PD3, there is a double-emitter follower arrangement in which the collector of the phototransistor is connected directly to the collector of the amplifying or junction transistor in the photo-Darlington and the emitter of the phototransistor is connected to the base of the junction transistor.

The emitter of the amplifying transistor of the photo-Darlington is grounded while its collector is connected to the +12 volt source through resistor R 14 (FIG. 5A). The collector of photo-Darlington PD3 is also connected, through Capacitor C 6, and wire 134 to the base of transistor Q 4 of a Darlington pair comprising transistors Q 4 and Q 6. The collector of transistor Q 4 is connected to the collector of transistor Q 6 while the emitter of transistor Q 4 is connected to the base of transistor Q 6. The emitter of transistor Q 6 is connected, through resistor R 26 to a −12 volt source while a capacitor C 9 is disposed in parallel with resistor R 26.

To establish an appropriate bias for the control circuit of the transistor Q 4, so that it may be modulated from the collector of photo-Darlington PD3, the wire 134 is connected to the +12 volt source, through resistor R 16 and to the −12 volt source, through resistor R 17.

The collectors of transistors Q 4 and Q 6 are connected, through series arranged resistors R 21 and R 24, to the +12 volt source. A capacitor C 8 connected between ground and the junction of resistors R 21 and R 24 assures that an appropriate capacity of current is available, without draining the +12 source, each time the Darlington pair, i.e., transistors Q 4 and Q 6 are triggered.

It is now seen that, as the pulses of infrared light from L 1 impinge on the base of photo-Darlington PD3, continuous light from lamp L 3 (controlled as to brightness by potentiometer R12) also impinges thereon. Photo-Darlington PD3 is used in order to develop amplification directly within itself, in order to avoid noise at the high impedance points in the circuit. The output of detector PD 3 is differentiated by an RC circuit including a combination of capacitor C 6 and resistor R 17, the differentiated output of which is provided to the base of transistor Q 4.

One of the advantages derived from our combination of lamp L 3, detector PD 3 and the differentiated circuit is that, while detector PD3 normally has a specified rise time in the order of 100 microseconds and a fall time of greater than 200 microseconds, we are able, by means of bia illumination from Lamp L 3, to develop crisp 25 microsecond pulses into the base of transistor Q 4 and transmit them further on through the circuit.

The illumination bias assemblies 130a and 130b are particularly useful when the distance between the sources 40a, 40b and their respective sensors 50a and 50b are varied. Our experiments indicate that considerable manipulation, however, of a potentiometer R 12 or R 13 for adjustment of the lamp intensity or light bias is necessary when the beam distance is changed.

While we do not fully understand why changes in intensity of the light bias are necessary, it appears that this light bias established by lamps L 3 and L 4 does not simply function to establish a threshold. If this were so, only a single intensity would be necessary to maintain the optimum operating conditions for the sensors 50a and 50b. Instead, we have found some unexpected phenomenon which enables us to use light to modify the modulation transfer function characteristic so as to extend the high frequency response so that while the photo-Darlingtons PD3 and PD4 are normally blind to the short duration pulse (25 microseconds), the illumination bias, when present, and at the proper level of intensity enables these same pulses to be detected. Indeed the light bias enhances the effectiveness of the detectors.

The manufacturing data for the photo-Darlingtons PD3 and PD4 indicates a rise time of 100 microseconds and a fall time of 200 − 250 microseconds, the slow response behavior being caused by the base charge capacitance. However, both the leading and trailing edges of the pulse generated by the photo-Darlington's in our detector as it receives the pulsed IR beam, closely approximate the leading and trailing edges of the transmitted (optical) pulses. One possible explanation of this very useful behavior is that the bias illumination generates an electron flow in the base region of the detector which, in effect, short-circuits the base-collector capacitance, or provides a low resistance discharge path for it, thus drastically reducing the time constant of the device. This explains the fall or decay time improvement but not that of the rise time. However if one considers the base structure as comprising a capacitor having both a series and parallel resistance, then the effectiveness of the illumination bias on both rise and fall behavior is easily seen. We believe that through the use of a visible (red) emitting diode in place of the IR diode, that the effect is equally valid when the detected pulses are of visible light. Moreover, we believe that through the use of a constant, adjustable intensity, visible light emitting diode or a constant, adjustable intensity infrared emitting diode in place of the lamp L 3, that the effect is equally valid.

Resistor R 14 comprises a pull-up resistor for the photo-Darlington PD3. Resistors R 16 and R 17 provide a basic d.c. level return between the +12 and −12 volt input supplies to the base of transistor Q 4. Resistor R 24 is the pull-up resistor for the Darlington amplifier, i.e., transistors Q 4 and Q 6, while resistor R 26 is an emitter resistor, by-passed by capacitor C 9, to provide a return to −12 volts. The amplified signal, via wire 135, from the second Darlington transistor Q 6 is transmitted through capacitor C 13 to pin 5 of an operational amplifier IC 8.

Pin 4 of amplifier IC 8 is connected to ground through Resistor R 30 while pin 10 is connected to wire 136. The operational amplifier IC 8 provides an output signal denoted by pulses 137, to wire 136 and its amplitude can be adjusted by potentiometer or variable resistor R 37, which is in series with resistor R 32 across pins 4 and 10 of amplifier IC 8.

Shielded cable 136 leads through the resistance element of a potentiometer R 39 to ground. The wiper contact is of potentiometer R 39 is connected through shielded cable 139, to pins 1 and 2 of a combination Nand Gate and Schmitt trigger IC 3, seen in FIG. 5B. Resistors R 28 and R 30 both provide current returns to ground for the non-inverting and inverting inputs of the operational amplifier IC 8.

The ratio of the resistance of resistor R30 to the sum of the resistances of resistor R 32 and potentiometer R 37 determines the amplification factor of the operational amplifier IC 8.

As pointed out above, the second sensor 50b and the detector amplifier 140b are identical to the corresponding sensor 50a and amplifier 140a. The second sensor 40b includes housing 51b having iris 231 and containing phot-Darlington PD4, as well as lamp L 4 of the illumination bias assembly 130b. Current to lamp L 4 is supplied via wire 233 and potentiometer R 13.

The detector amplifier 140b includes, as shown in FIG. 5A, the circuits having capacitors C7, C10, C11 and C14, transistors Q 5 and Q 7. Resistors R 15, R 18, R 22, R 29, R 31 and R 33, potentiometers R 35 and R 38 and operational amplifier IC 9 which are connected together by wires, such as wires 233, 234, and 236 in the manner illustrated in FIG. 5A. Operational amplifier 140b produces a pulse 237 along wire 239, responding to the pulses directed from the infrared emitting diode L 2 against the photosensitive base of the photo-Darlington PD4, in the same manner as the pulses 137 are generated in cable 139 in response to pulses 91 from the infrared emitting diode L 1.

Wire 239 leads to pins 4 and 5 of the gate or trigger IC 3, in FIG. 5B, of the counter reset circuit 120. Pins 14 of gate IC 3 is connected to the +5 volt source and pin 12 to ground. The Nand Gate Schmitt trigger IC 3 is a negative logic, biasable, pulse generator in which the negative output pulse, denoted by numeral 138, is of constant amplitude, occurring only so long as the input voltage of the positive pulses to pins 1, 2, 4 and 5 exceeds a predetermined value, as will be explained hereinafter.

This Nand Gate IC 3 works in such a way that both the first pair of pins 1 and 2 and the second pair of pins 4 and 5, must simultaneously be brought positive in order for a negative pulse to appear at pin 6 and be taken from it to pins 1 and 2 of Nand Gate IC 4. Nand Gate, Schmitt trigger combination IC 3 performs the pulse-level decision function and shapes the pulse sent from pin 6 to a more satisfactory logic level shape.

From pin 6 of trigger IC 3, wire 150 leads to pins 1 and 2 of the negative logic, quad, Nand Gate IC 4. Pins 14 and 7 of Nand Gate IC 4 are connected, respectively, to the +5 volt source and to ground. Pin 3 is connected to wire 123 which leads to pins 2 and 3 of the binary counter IC 6.

The positive-going pulses 124 from gate IC 4, which exist only when simultaneous pulses of proper amplitude are produced by both photodetectors, PD3 and PD4, are sent to pins 2 and 3 of the four level binary counter IC 6. As described above, the 300 microsecond pulses at two kilohertz are transmitted from multivibrator IC 5 to the input pin 14 of the counter, IC 6, to pace the counter. In the absences of pulses on pins 2 and 3, counter IC 6 counts into decoder IC 7, which is a BCD to decimal converter or decoder; however, since pulses are being provided normally to pins 2 and 3, the counter IC 6 can only count one and reset, and count one and reset, ad infinitum, at the established 2 kilohertz rate. Thus, no count greater than one ever appears under these circumstances on the output of decoder IC 7. Counts 0, 1, 2, 3, 4, 5, etc., however, would otherwise appear as logic zero pulses on pins 1, 2, 3, 4, 5, 6, etc., respectively.

In more detail, when the binary coded decimal counter IC 6 detects a pulse, such as one of the disabling pulses 129, simultaneously on pins 2 and 3, and the pin 14 is receiving the pulses 121 from the one shot multivibrator IC 5, there will be no count generated or transmitted by the counter IC 6 thence, no signal is imposed on any of pins 8, 9, 11 or 12 of counter IC 6. The pulses 121 and 129 can be in phase or out of phase with each other. It does not matter, so long as the numerical count of pulses 121 and 129 remain the same.

When, however, certain of the pulses 129 are absent, the counter IC 6 detects this discontinuity and begins feeding the positive pulses to the decoder IC 7. With one missing pulse in the train of pulses 129, a signal is imposed on pin 8. With two consecutive missing pulses 129, a signal is imposed on pin 9. When three consecutive missing pulses 129 are detected, signals are imposed on pins 8 and 9 simultaneously and with four consecutive missing pulses, a signal is imposed in pin 11.

The signal from pin 9 of counter IC 6 is fed to pin 13 of decoder IC 7. The signal from pin 9 of counter IC 6 is fed to pin 14 of decoder IC 7 and the signal from pin 11 of counter IC 6 is fed to pin 12 of decoder IC 7. The signal, from pin 12 of counter IC 6 is fed to pin 15 of decoder IC 7 and also to pin 1 of counter IC 6. Pin 8 of decoder IC 7 is connected to ground and pin 16 there is connected to the +5 volt source.

Referring specifically to decoder IC 7, when pin 13 alone is high (or is provided with a signal 1 or pulse), a signal is imposed on pin 2. When pin 14 is provided with a pulse, a signal is imposed on pin 3. When both pins 13 and 14 are simultaneously provided with signals, pin 4 is provided with a signal, and when pin 12 is provided with a signal, pin 5 is provided with a signal as the binary counts continue from counter IC 6, pins 6, 7, 8, 9 and 10 are respectively and sequentially provided with signals.

It is thus seen that the purpose of the Schmitt trigger IC 3 is to detect the eliminated and altered pulses and transmit only satisfactory or unaltered pulses to the gate IC 4, leaving a time lapse for such eliminated pulses. Preferably, any pulse below an amplitude or gain of 1.7 volts is considered by the particular Schmitt trigger IC 3 which we employ, to have been altered or eliminated, while all having an amplitude above 1.7 volts, cause triggering of the Schmitt trigger IC 3 to feed uniform amplitude pulses to the gate IC 4, in response thereto.

The gate IC 4 simply inverts the received pulses and imposes them simultaneously at pins 2 and 3 of the binary counter IC 6. Therefore, we can, by selecting a specific pin of decoder IC 7 choose any number of sequential missed counts on which to set the latching circuit, to be described hereinafter.

In the present invention, we have selected pin 5 of decoder IC 7 for the output. This permits triggering on the fourth missed count. We could, however, have selected pin 2, 3 or 4 which would have designated one missed count for triggering if the output were from pin 2, two missed counts, if the outout were from pin 3 and three missed counts, if the output were from pin 4.

Wire 124 leads to the latch and circuit control 160 for the fail safe motor control 170. Associated with the control 160 is a manual reset switch assembly 180 and an indicator assembly 190. The negative going pulse 125 of 300 microseconds width is directed along cable 124 to pin 3 of Nand Gate IC 10. Associated with gate IC 10 is a second and identical negative logic Nand Gate IC 11. The output pin 2 of Nand Gate IC 10 is connected, via wire 161, to pin 7 of Nand Gate IC 11 while the output pin 5 of Nand Gate IC 11 is fed back tp pin 4 of gate IC 10 via wire 162.

Pin 6 of Nand Gate IC 11 is connected via wire 163 through resistor R 34 to the +5 volt source. One terminal of the normally open reset switch 180 is also connected via wire 163 to pin 6. The other terminal of switch SW 2 is connected to ground. A small capacitor C 16 is disposed across pins 5 and 6 of gate IC 11.

With the arrangement of the two Nand Gates IC 10 and IC 11, a latching circuit is provided in which the gates IC 10 and IC 11 function as a latch.

In other words, when a negative going pulse 125 is imposed on pin 3 and pin 1 is at ground potential, a "not-and" condition is set up to provide a positive pulse at pin 2 of Nand Gate IC 10. This positive pulse is imposed on pin 7 of Nand Gate IC 11. Pin 6 normally has a +5 volt potential. Therefore, an "and" condition exists to provide a "no pulse" condition on pin 5 of Nand Gate IC 11.

The no-pulse condition lasts only so long as the initial pulse from pin 2 of Nand Gate IC 10 exists. As such a pulse collapses, a not-and condition is set up due to the potential differential on pins 6 and 7 of Nand Gate IC 11. This generates a positive pulse on pin 5 of Nand Gate IC 11 which is simultaneously fed via wire 162 to pin 4 of Nand Gate IC 10 and via wire 165 and resistor R 40 to the base of transistor Q 9.

The positive pulse on pin 4 of Nand Gate IC 10 is thus different from the negative potential of pin 3, causing another pulse to be imposed on pin 2 of Nand Gate IC 10, thereby producing a subsequent cycle, the effect being to latch the Nand Gates IC 10 and IC 11 to generate a potential on wire 165. Thus, the subsequent pulses, generated at pin 5 of decoder IC 7 are ignored by the latched gate IC 10.

Since the output of the first half of Nand Gate IC 10 (pin 2) is connected to one of the inputs (pin 7) of gate IC 11 and the output of the second latch (pin 5 of gate IC 11) is again connected to the alternate input (pin 4) of first Nand Gate IC 10, a positive latch is provided. This positive latch is maintained by the circuit from pin 6 of Nand Gate IC 11 through the 1K resistor R 34 to +5 volts.

Resetting of the positive latch, when desired, is accomplished by depressing switch SW 1 to connect pin 6 of gate IC 11 to ground, thus turning the latch off.

The output of gate IC 10, via pin 2 and wire 164 is fed through resisotr R 36 to the base of transistor Q 8 of the indicator assembly 190. The emitter of transistor Q 8 is grounded while its collector is connected, via wire 191 through lamp L 5 and wire 192 to the +5 volt source. Lamp L 5, when lighted, indicates that the latch, i.e., gates IC 10 and IC 11, are set in an operating direction. The lamp L 5 goes out when manual push button switch SW 1 is used to reset the latch.

Transistors Q 9 and Q 10 of the fail safe control form a Darlington pair in which the collectors thereof are connected together, via wire 171. Also these collectors are connected through the coil of relay Ry 1 to the +12 volt source. The emitter of transistor Q 9 is connected to the base of transistor Q 10 while the emitter of transistor Q 10 is grounded.

Due to the normal condition of the latch 160, pin 5 of IC 11 is at logic level therefore, sufficient current normally flows in the work circuit of transistor Q 10 so as to energize the coil of relay Ry 1 and maintain its normally open switch SW 2 in a closed condition. A diode CR 6 in parallel with the coil of relay Ry 1 prevents a back EMF surge, when the back of the coil collapses, due to the opening of the circuit. Switch SW 2 is connected, via wires 172 and 173 through a radio frequency filter RF 1 and wires 174 and 175 to the motor control circuit in the motor control panel 200, and thus controls, via wires 176 and 177, the main motor M of the tufting machine 10. When switch SW 2 is closed, the circuit to motor M is made to cause reciprocation of the needles. With switch SW 2 closed, the fail safe circuit does not prevent the starting or stopping of motor M by the manual switch SW 3.

One of the advantages of our stop motion circuity is its complete insensitivity to electrical noise and its very high sensitivity in terms of its detectivity of very fine threads at great distances. As compared to the scanning detector in the prior art, our stop motion machines requires no motor controls, whatever. It generates a train of pulses completely electronically, at low energy, which does not interfere with the operation of the tufting machine.

Another advantage is that our stop motion machine does not have to pass across the warp sheet to do its detecting.

The elements are disposed one on either side of the warp sheet of yarns 15, completely out of the way of the operation of the machine. We use an infrared pulsing source, rather than visible light, laser beams, or an incandescent continuous source of visible stroboscope source, because the energy conversion into pulsed infrared is very efficient. When compared to visible light sources, the light emitting diodes, L 1 and L 2 have a useful energy conversion more than an order of magnitude more efficient.

There is no hazard due to high energy coherent light being sent by reflective surfaces into places where people are located and could be bothered or have their vision affected. The beams of infrared energy $B_1$ and $B_2$ can be controlled by suitable irising to a size most closely matching the size of threadline which one wants to detect. The biasing illumination, used to adjust the pulse detectivity of each of the photo-Darlingtons PD3 or PD4 through control of the brightness of lamps L 3 and L 4, causes the detectivity of the photo-Darlingtons to increase by several orders of magnitude over that with lamps L 3 and L 4, extinguished.

The current control system used to drive the infrared emitting diodes L 1 and L 2 is unique in being able to drive, with constant equal current pulses, several additional similar diodes, if desired. Each such diode, such as diodes L 1 or L 2, will produce infrared pulses of substantially the same intensity level as the others. The IR emitting diodes are operated in a series of spaced pulses (rather than continuously) in order to take advantage of their ability to handle and convert efficiently into infrared emission large pulse currents, although their average current handling capability is quite limited because of their small size. The 25 microsecond pulse length (2kH$_z$ repetition rate) was chosen as a compromise between the potentially higher current capability for shorter pulses (70 Amp at 1 microsecond) and the desirability of using practical, economical electrical transmission and control devices, and of generating minimum external electrical interference. Moreover, the 25 microsecond pulse is very short relative to the response time (over 300 microseconds) of the detectors PD3 and PD4 selected, if they were not biased optically. It is this bias that makes the system with less than 300 microsecond duration pulses, work.

However, pulses of 5 – 10 microsecond at repetition rates of from 1kH$_z$ to 10kH$_z$ are certainly practical for our device. All the digital logic elements are capable of handling much shorter pulses (ca. 20 nanoseconds) and pulse rates to 50 – 100 MegaHz.

Another feature of our circuit is that, by changing the detection point on the output of decoder IC 7, we can make our circuit sensitive to yarns moving at very high velocity or very showly, by choice.

The following tables give values and specific identification for the various components of FIGS. 5A and B.

TABLE 1

Integrated Circuits

| Component | Identification No. | Service |
|---|---|---|
| IC1 | 9601 | Free Running Multivibrator |
| IC2 | 9601 | Free Running Multivibrator |
| IC3 | 7413 | Nand Gate-Schmitt Trigger |
| IC4 | 7400 | Quad Nand Gate |
| IC5 | 74121 | One Shot Multivibrator |
| IC6 | 7493 | Coded Decimal Binary Counter |
| IC7 | 7442 | Binary Coded Decimal to Digital Decoder |
| IC8 | 741 | Operational Amplifier |
| IC9 | 741 | Operational Amplifier |
| IC10 | 680 | Nand Gate |
| IC11 | 680 | Nand Gate |
| IC12 | 7413 | Nand Gate Schmitt Trigger |
| IC13 | 7493 | Binary Counter |
| IC14 | 7442 | Binary Coded Decimal to Digital Decoder |

TABLE II

Capacitors in FIG. 5

| Component | Value in Microfarads Unless Otherwide Stated |
|---|---|
| C1 | 0.1 |
| C2 | 0.005 |
| C3 | 0.022 |
| C4 | 16,000 |
| C5 | 0.01 |
| C6 | 0.01 |
| C7 | 0.01 |
| C8 | 0.1 |
| C9 | 0.2 |
| C10 | 0.1 |
| C11 | 0.2 |
| C12 | 0.01 |
| C13 | 0.01 |
| C14 | 0.01 |
| C15 | 0.1 |
| C16 | 300 pfd |

TABLE III

Resistors in FIG. 5

| Component | Value in Ohms |
|---|---|
| R1 | 10k |
| R2 | 10k |
| R3 | 5.1k |
| R4 | 5.1k |
| R5 | 2.5k |
| R6 | 56 |
| R7 | 0.25 |
| R8 | 100 |
| R9 | 100 |
| R10 | 3k |
| R11 | 4.7k |
| R12 | 1k |
| R13 | 1k |
| R14 | 3.3k |
| R15 | 3.3k |
| R16 | 470k |
| R17 | 200k |
| R18 | 470k |
| R19 | 200k |
| R20 | 1k |
| R21 | 470 |
| R22 | 470 |
| R23 | 39k |
| R24 | 20k |
| R25 | 20k |
| R26 | 10k |
| R27 | 10k |
| R28 | 10k |
| R29 | 50k |
| R30 | 1k |
| R31 | 1k |
| R32 | 1k |
| R33 | 1k |
| R34 | 1k |
| R35 | 10k |
| R36 | 3k |
| R37 | 10k |
| R38 | 10k |
| R39 | 10k |
| R40 | 21k |
| R41 | 33k |

TABLE IV

Diodes

| Component | Identification |
|---|---|
| CR1 | IN 4009 Silicon diode |
| CR2 | IN 4009 Silicon diode |
| CR3 | IN 4005 Silicon diode |
| CR4 | IN 4005 Silicon diode |
| CR5 | IN 4005 Silicon diode |
| CR6 | IN 4009 Silicon diode |

TABLE V

Light Emitting Diodes

| Component | Identification |
|---|---|
| L1 | ME5 |
| L2 | ME5 |

TABLE VI

Transistors

| Component | Identification | |
|---|---|---|
| Q1 | 2 N 3053 | NPN |
| Q2 | 2 N 3055 | NPN |
| Q3 | 2 N 3646 | NPN |
| Q4 | 2 N 3646 | NPN |
| Q5 | 2 N 3646 | NPN |
| Q6 | 2 N 3643 | NPN |
| Q7 | 2 N 3643 | NPN |
| Q8 | MPS 6531 | NPN |
| Q9 | 2 N 4401 | NPN |
| Q10 | 2 N 3053 | NPN |

TABLE VII

Photo Darlingtons

| Component | Identification |
|---|---|
| PD3 | QS 507 |
| PD4 | QS 507 |

TABLE VIII

Lamps

| Component | Identification |
|---|---|
| L3 | 12 V subminiature bulbs |
| L4 | 12 V subminiature bulbs |

Figure 2:
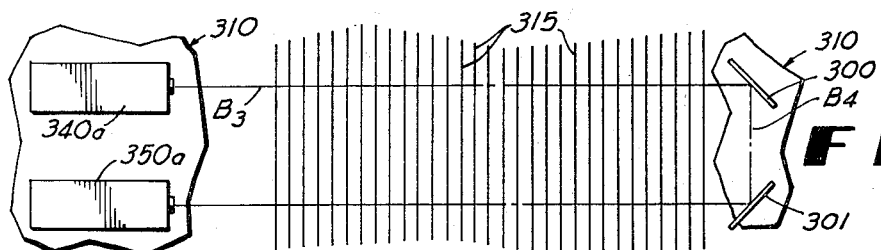
FIG. 2 is a schematic representation of a modified form of the present invention showing reflecting surfaces being utilized for directing the infrared beam from the transmitter across a yarn sheet to the transducer of the device of the present invention.

In FIG. 2, it is seen that a beam source 340a similar to beam source 40a can be mounted on one side of a textile machine 310, the beam $B_3$ of which is directed closely adjacent one side of the warp sheet 315, and against a reflecting surface or mirror 300. The beam $B_3$ is preferably directed perpendicularly to the yarns of warp sheet 315 as beam $B_4$, the reflecting surface 300 being arranged at 45° to the Beam $B_3$ to direct beam $B_4$, parallel to the yarns of warp sheet 315, against a second reflecting surface 301.

The surface 301 is arranged at 45° to beam $B_4$ and reflects it as beam $B_5$ across the warp sheet 315 so that it is received in the sensor or detector 350a which is similar to sensor 50a. The sensor 350a is disposed directly below beam source 340a.

While the reflecting surfaces 300 and 301 are preferably pentaprisms, it will be understood that planar mirrors or roof prisms can be used in their place, if desired.

Figure 3:
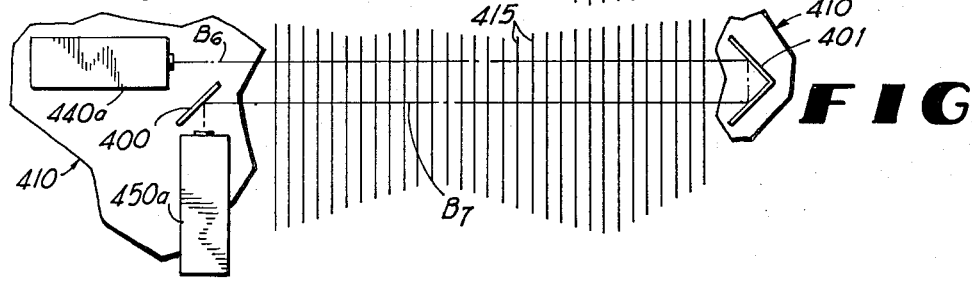
FIG. 3 is still another modified form of the present invention showing reflecting members for directing the beam from the transmitter to the transducer.

In FIG. 3, it is seen that a beam $B_6$ from a source 440a, similar to source 40a, can be directed against a corner cube reflector prism 401 which reflects the beam $B_6$ back, as beam $B_7$ against the mirror 400.

The mirror 400 then directs the beam $B_7$ into the sensor or detector 450a, similar to detector 40a. The axis of sensor 450a is perpendicular to the axis of source 440a, as shown in FIG. 3. In this way, the two parallel, closely adjacent beams $B_6$ and $B_7$ can be produced for supervising yarns 415. Beams $B_6$ and $B_7$ can be directed across opposite sides of warp sheet 415 so as to detect, in a vertical warp sheet, yarn displacements to either side of the sheet.

In FIG. 6, it is seen that, when a single sensor or detector 550a similar to sensor 50a is substituted in the circuit of FIGS. 4, 5A and 5B, the signal from detector or sensor 550a is fed, via wire 535, to the operational or detector amplifier 640a, through cable 539, the signal from amplifier 640a is fed to a Nand Gate Schmitt trigger IC 23 of the counter and reset circuit 520, thence, through wire 550 to the remainder of the circuit of the transducer. Detector amplifier 550a is identical to detector amplifier 140a and the counter and reset circuit 520 is identical to counter and reset circuit 120, except, in place of the feed from the amplifiers 140a and 140b via cable 139 and 239 to Nand Gate IC3, the cable 539 is connected to pins 1, 2, 4 and 5 of the Nand Gate Schmitt trigger IC 23. Nand Gate Schmitt trigger IC 23 and IC3 are otherwise identical.

In FIG. 7 it is illustrated that, in place of the two light emitting diodes L 1 and L 2, a single light emitting diode L 10 can be employed in source 640a for simultaneously directing infrared light, through two lenses 584 and 585 across two portions of a warp yarn sheet 615, to two sensors 650a and 650b. Otherwise, the circuit of this modification is identical to the circuit of FIGS. 4, 5A and 5B.

In FIG. 8, it is illustrated that the infrared light beam $B_8$ from a single beam source 840a, identical to beam source 40a can be split into two beams $B_9$ and $B_{10}$ and directed across a warp yarn sheet 715 to two separate sensors 850a and 850b by disposing a semi reflecting mirror 800 in front and adjacent the beam source 840a so that part of the beam $B_8$ from source 840a is deflected perpendicularly to form beam $B_{11}$ as the remainder of the beam $B_8$ passes as beam $B_9$ through mirror 800 in a path toward sensor 850a. A reflecting mirror 801 arranged parallel to, but offset from mirror 800 directs the beam $B_{11}$, as beam $B_{10}$ toward sensor 850b, the optical axis of sensor 850b being parallel to and spaced from that of sensor 850a by approximately the distance between parallel beams $B_9$ and $B_{10}$.

Referring now to FIGS. 9 and 10 of the drawing, a more complicated monitoring device is depicted therein. This monitoring device, while having essentially the same elements as the embodiment depicted in FIGS. 4, 5A and 5B, nevertheless utilizes several beams of infrared pulses which are sequentially generated and monitored.

In more detail, the device of FIG. 9 includes a pulse generator 960 which is identical to the pulse generator 60, the signal from the pulse generator 960 being fed into a binary counter IC 13. At the binary counter IC 13, pulses are sequentially fed to a binary to digital decoder IC 14. The pulses from the generator 960 are denoted in the pulse-time graph of FIG. 10 as pulses P.

The pulses thus fed to the binary counter IC 13 are then divided by the binary counter IC 13 into individual pulses which are fed sequentially from the various pins 8, 9, 11, 12 and 1 to the pins 13, 14, 12 and 15 of the binary to digital decoder IC 14, as shown in FIG. 9. From the pins 1 through 10, inclusive of decoder IC 14, a series of pulses are sequentially generated as shown in FIG. 10, as pulses P1, P2, P9, P10, the last pulse P10 at pin 10 being fed back as a reset input to the binary counter IC 13 so as to start the sequence, again. By such an arrangement, pulse P1 is fed, via wire 951, to current regulating amplifier 970a, the pulse P2 is fed via wire 952 to current regulating amplifier 970b, etc., until the ninth and tenth pulses $P_9$ and P10 are fed, respectively, via wires 959 and 960, to current regulating amplifier 970c and 970d. These current regulating amplifiers 970a, 970b, 970c, 970d are identical to the current regulating amplifier 70.

Each current regulating amplifier 970a, 970b, 970c, 970d feeds its individual beam source 940a, 940b, 940c and 940d. Beam sources 940a, 940b, 940c, 940d direct their individual infrared light beams $B_{21}$, $B_{22}$, $B_{29}$, $B_{30}$, to individual sensors 950a, 950b, 950c, 950d which, in turn, feed the signals to detector amplifiers 1040a, 1040b, 1040c, 1040d, respectively.

The amplified signals from all of the detector amplifiers 1040a, 1040b, 1040c, and 1040d are respectively fed to individual counter and reset circuits 920a, 920b, 920c, 920d while the signal from the tenth or last current regulating amplifier 970d (or any other of the 970 amplifiers) is fed via the transmitter signal amplifier 910 into the individual counter and rest circuits 920a, 920b, 920c, 920d. The circuits 920a, 920b, 920c, 920d are each similar to circuit 120 in that the signal is decoded by an arrangement identical to the binary counter IC 6 and the BCD decoder IC 7. Thence, the signal from the circuits 920a, 920b, 920c, 920d are fed to shut off a particular motor.

Referring now to FIG. 11 of the drawings, it is seen that any numbers light emitting diodes L 100, L 101, L 102, L 103, L 104, L 105, L 106, L 107 and L 108, may be arranged in series for simultaneous firing in the same manner as the firing of the diodes L 1 and L 2 of the above embodiment. A corresponding number of sensors 1150a, 1150b, 1150c, 1150d, 1150e, 1150f, 1150g, 1150h and 1150i are arranged to receive the beams from the diodes L 100 through L 108 inclusive. Each beam is used as a separate detection mechanism for articles passing between its source and sensor.

The current for triggering the series arranged diodes L 100 through L 108 is provided from a pulse generator 1160 through a current regulating amplifier 1170, via wire 1182 and wire 1180. Thus, the diodes L 100 through L 108 are triggered, simultaneously, in the same manner as the diodes L 1 and L 2 are triggered, simultaneously.

The sensors 1150a, 1150b, 1150c, 1150d, 1150e, 1150f, 1150g, 1150h, 1150i feed respectively to detector amplifiers 1140a, 1140b, 1140c, 1140d, 1140e, 1140f, 1140g, 1140h and 1140i. In some instances, such as for the sensor 1150a, 1150h and 1150i, the detector amplifier 1140a, 1140h and 1140i feed to individual counter and reset circuits 1120a, 1220h and 1120i and thence to individual latch and motor control circuits 1160a and 1160h and 1160i. If desired, detector amplifiers, such as detector amplifier 1140b and 1140c, can be fed to a single counter and reset circuit 1120b and, thence, to a single latch and motor control circuit 1160b. Indeed, a plurality of four detector amplifiers, such as detector amplifier 1140d, 1140e, 1140f, and 1140g, can be fed to a single counter and reset circuit 1120d and thereafter to a single latch and motor control circuit 1160d.

The current regulating amplifier 1170 feeds to all counter and reset circuits, via the transmitter signal amplifier 1110, so as to provide a comparison pulse to each of the counter and reset circuits 1120a, 1120b, 1120d, 1120h and 1120i in the same manner as the signal is transmitted from transmitter signal amplifier 110 to the counter and reset circuit 120.

In the situation of the counter and reset circuits 1120a, 1120h and 1120i which receive a single signal, the signals on wire 1139a, 1139h and 1139i are each fed to the pins of a Schmitt trigger, such as pins 1, 2, 4 and 5 of the Schmitt trigger IC 3, in FIG. 5b in its associated circuit 1120a, 1120h 1120i. The remaining circuit of each counter and reset circuit would correspond to the circuity of FIG. 5b. Likewise, where two signals are fed from the two detector amplifiers 1140b and 1140c, these would be fed in through wires 1139b and 1239b in the manner similar to the feeding of signals through wires 139 and 239 are fed to the Schmitt trigger IC 3 in FIG. 5b. In the case of four separate signals, such as the signals coming from amplifier 1140d, 1140e, 1140f, and 1140g, these would be fed in through separate wires 1139d, 1139e, 1139f and 1139g respectively to the pins 1, 2, 4 and 5 of a single Schmitt trigger such as Schmitt trigger IC 3 of FIG. 5b.

It is, therefore, seen that a quite versatile arrangement is provided which will permit monitoring of paths through which objects will pass, utilizing infrared over very appreciable distances.

We claim:

1. Process of detecting the momentary presence of object between two points, comprising:
   a. generating a first electrical signal consisting of discrete time spaced successive electrical pulses;
   b. converting said first electrical signal into electromagnetic radiation pulses;
   c. directing said electromagnetic radiation pulses from one of said points toward the other of said points;
   d. receiving said electromagnetic radiation pulses at said other of said points;
   e. generating a second electrical signal consisting of discrete spaced successive electrical pulses corresponding to the received electromagnetic radiation pulses;
   f. comparing the pulses of said first electrical signal with the pulses of said second electrical signal for detecting a discontinuity of the pulses of said second electrical signal;
   g. counting the number of said detected discontinuities in a prescribed consecutive group; and
   h. generating a control signal in response to the detection of said prescribed number of said detected discontinuities.

2. The process defined in claim 1 wherein said electromagnetic radiation pulses are infrared light pulses.

3. The process defined in claim 1 wherein said object is one of a plurality of parallel yarns which moves out of its prescribed path adjacent said beam.

4. The process defined in claim 1 wherein the time spaced pulses have a frequency of approximately 2kHz and each has a duration of approximately 25 microseconds.

5. The process defined in claim 1 wherein said time spaced pulses each have approximately the same amplitude and said pulses of said second electrical signal normally have approximately the same amplitude and wherein the momentary presence of an object in said electromagnetic radiation pulses will cause a drop in amplitude of said electromagnetic pulses and a corresponding drop in amplitude of said second electrical signal, and wherein the step of detecting the discontinuity of pulses includes detecting a change in the ratio of amplitude between pulses of said first electrical signal and pulses of said second electrical signal.

6. The process defined in claim 1 wherein said electromagnetic radiation pulses are infrared pulses generated by an infrared emitting diode and wherein said electromagnetic radiation pulses are received by a photosensitive element.

7. Process of detecting an object momentarily passing between a first point and a second point, comprising:
   a. generating and directing, in a beam from said first point to said second point, a series of electromagnetic radiation pulses, each pulse being time spaced from each other, each pulse having approximately the same characteristic;

b. receiving said series of pulses at said second point;

c. counting, in the received series of pulses, the number of eliminated and altered pulses; and d. providing a signal in response to the counting of a prescribed number of altered and eliminated pulses.

8. The process defined in claim 7 wherein the step of counting the altered and eliminated pulses includes counting all pulses having an amplitude less than a threshold amplitude with respect to the general amplitude of the remaining pulses in that series.

9. The process defined in claim 8 wherein said step of counting the eliminated and altered pulses comprises comparing the generated series of pulses and the received series of pulses for ascertaining the number of received pulses having a difference in the amplitude from the remaining received pulses.

10. The process defined in claim 7 including:
   a. generating and directing from a third point a second beam similar to the first mentioned beam and in which a second series of electromagnetic radiation pulses are in phase with first mentioned series of pulses;
   b. receiving said second series of pulses at a fourth point;
   c. simultaneously comparing the received first mentioned series of pulses and the received second series of pulses with the first mentioned electromagnetic pulses;
   d. and wherein the step of counting includes detecting and counting the altered and eliminated from the received second series of pulses.

11. A photodynamic monitor comprising:
A. a transmitter having
   a. a pulse generator for producing a generated first signal having spaced discrete first pulses; and
   b. a beam source controlled by said pulse generator for producing a beam of second discrete pulses of electromagnetic radiation in response to the generated first signal from said pulse generator, said beam being directed across a space to be monitored for being interrupted when an object passes across said beam; and
B. a transducer having:
   a. a sensor for receiving said beam and for producing a second signal having spaced discrete third pulses in response to said second pulses of said beam; and
   b. means for digitally comparing simultaneously said first pulses and said third pulses, and for generating a third signal in response to a prescribed digital difference between said first pulses and the said third pulses.

12. The photodynamic monitor defined in claim 11 wherein said source includes a plurality of light emitting diodes simultaneously driven by said pulse generator and wherein said sensor includes a plurality of photosensitive detectors respectively receiving the light from said diodes.

13. The photodynamic monitor defined in claim 12 wherein said light emitting diodes are disposed in series.

14. The photodynamic monitor defined in claim 13 wherein a capacitor is in the circuit with said diodes for being charged between adjacemt pulses and for discharging when said second pulses are generated.

15. The photodynamic monitor defined in claim 11 wherein said pulse generator includes a pair of free running multivibrators, each having a multivibrator and an RC circuit therefore, one of said multivibrators generating the pulse for said first pulses rate and the other generating the duration of each pulse.

16. The photodynamic monitor defined in claim 11 wherein said pulse generator includes:
   a. means for generating time spaced positive pulses;
   b. means for receiving and inverting said positive pulses; and
   c. a current control amplifier triggered by said inverted pulses.

17. The photodynamic monitor defined in claim 16 wherein said light source includes a light emitting diode driven by said amplifier.

18. The photodynamic monitor defined in claim 17 including a capacitor with said diode for filtering power supply pulses occurring as said diode is triggered by said amplifier.

19. In a photodynamic monitor,
A. a transmitter including:
   a. means for generating a continuous train of electrical pulses according to a pulse pattern;
   b. a source of electromagnetic energy pulses, controlled by said means for producing a corresponding train of electromagnetic pulses according to said pulse pattern; and
B. a transducer for receiving said electromagnetic pulses, and said transducer being electrically connected to said means for generating pulses for also receiving said electrical pulses, means in said transducer for detecting a change in the pulse pattern; and of said electromagnetic pulses from the pattern of said electrical pulses.
C. means for shutting down a motor or other device in response to said detected change in the pulse pattern.

20. The photodynamic monitor defined in claim 19 wherein said source includes a plurality of light emitting diodes simultaneously driven by said first mentioned means and wherein said sensor includes a plurality of photosensitive detectors respectively receiving the light from said diodes.

21. The photodynamic monitor defined in claim 19 wherein said light emitting diodes are disposed in series.

22. The photodynamic monitor defined in claim 19 wherein a capacitor is in the circuit with said diodes for being charged between adjacent pulses and for discharging when said second pulses are generated.

23. The photodynamic monitor defined in claim 19 wherein said first mentioned means includes a pair of free running multivibrators, each having a multivibrator and an RC circuit therefore, one of said multivibrators generating the pulse for said first pulses rate and the other generating the duration of each pulse.

24. The photodynamic monitor defined in claim 19 wherein said first mentioned means includes:
   a. means for generating time spaced positive pulses;
   b. a current control amplifier controlled by said pulses.

25. The photodynamic monitor defined in claim 20 wherein said source includes a light emitting diode driven by said amplifier.

26. The photodynamic monitor defined in claim 11 wherein said transducer includes an operational amplifier for amplifying said second signal.

27. The photodynamic monitor defined in claim 11 wherein said sensor includes a photo-Darlington for generating said second pulses.

28. The photodynamic monitor defined in claim 11 wherein said sensor includes a photo-detector and a light source shining on said photodetector, said light source being of insufficient intensity to actuate said photodetector but being sufficient to permit said pulses of said beam to actuate said photo-detector.

29. The photodynamic monitor defined in claim 11 including a motor control circuit, a motor controlled by said motor control circuit, a relay having a normally open switch, said relay when energized closing said switch, said normally open switch being in motor control circuit for preventing energization of said motor when said switch is open, means for energizing said relay, and means for de-energizing said relay when said discontinuity is detected.

30. The photodynamic monitor defined in claim 11 including a motor control circuit and an electrical latch triggered by said means upon detection of said discontinuity, disabling said motor control circuit in response thereto.

31. The photodynamic monitor defined in claim 11 wherein said means includes a binary counter and a decoder for said binary counter, said binary counter receiving said first pulses and said third pulses and transmitting to said decoder discontinuity pulses corresponding to the discontinuity between the first and third pulses, said decoder counting a prescribed number of discontinuity pulses for triggering a control circuit in response thereto.

32. The photodynamic monitor defined in claim 31 wherein said means includes a latch circuit in said control circuit for providing a continuous signal in said control circuit in response to the triggering of said control circuit.

33. The photodynamic monitor defined in claim 11 including reflector means for reflecting said beam from said source to said sensor.

34. The photodynamic monitor defined in claim 33 wherein said reflector is disposed on one side of a yarn sheet and said sensor and said source are disposed adjacent each other on the other side of said warp sheet.

35. The photodynamic monitor defined in claim 34 wherein said reflector means includes a pentaprism.

36. The photodynamic monitor defined in claim 34 wherein said reflector means includes a semi-reflector mirror disposed in front of said source and through which said beam is directed and a reflector for directing said beam back against said semi-reflector mirror and thence into said source.

37. Process of utilizing a pulsed radiation beam comprising directing said beam onto the photosensitive portion of an electrical photosensitive detector and simultaneously therewith continuously biasing said photosensitive detector by directing a prescribed and substantially constant intensity light onto said photosensitive portion of said detector, said light being of an intensity sufficient to modify the modulation transfer function characteristics of said detector for enhancing the high frequency response of said detector to said pulsed beam.

38. The process defined in claim 37 wherein the pulse duration of each pulse of said beam is less than that which would normally actuate said detector.

39. The process defined in claim 38 in which said duration is less than 300 microseconds.

* * * * *